(12) United States Patent
Sudou

(10) Patent No.: US 7,081,065 B2
(45) Date of Patent: Jul. 25, 2006

(54) DIFFERENTIAL APPARATUS

(75) Inventor: Noriyuki Sudou, Tochigi-ken (JP)

(73) Assignee: Tochigi Fuji Sangyo Kabushiki Kaisha, Tochigi-Ken (JP)

( * ) Notice: Subject to any disclaimer, the term of this patent is extended or adjusted under 35 U.S.C. 154(b) by 66 days.

(21) Appl. No.: 10/782,618

(22) Filed: Feb. 19, 2004

(65) Prior Publication Data
US 2004/0166985 A1 Aug. 26, 2004

(30) Foreign Application Priority Data
Feb. 21, 2003 (JP) .................... P.2003-043808

(51) Int. Cl.
*F16H 48/08* (2006.01)
(52) U.S. Cl. .................... 475/230
(58) Field of Classification Search ............. 475/230, 475/231
See application file for complete search history.

(56) References Cited

U.S. PATENT DOCUMENTS

| | | | | |
|---|---|---|---|---|
| 1,461,102 A | * | 7/1923 | Sternbergh | 475/230 |
| 3,344,688 A | * | 10/1967 | Frost | 475/231 |
| 3,894,447 A | * | 7/1975 | Michael | 475/230 |
| 3,974,717 A | * | 8/1976 | Breed et al. | 475/230 |
| 4,856,372 A | * | 8/1989 | Williamson | 475/230 |
| 5,059,160 A | * | 10/1991 | Raniero | 475/231 |
| 5,273,499 A | * | 12/1993 | Friedl et al. | 475/231 |
| 5,647,814 A | * | 7/1997 | Krisher | 475/230 |
| 6,027,422 A | * | 2/2000 | Yamazaki | 475/231 |
| 2004/0157696 A1 | * | 8/2004 | Saito et al. | 475/230 |

FOREIGN PATENT DOCUMENTS

| | | | |
|---|---|---|---|
| DE | 718 383 | 2/1942 | |
| DE | 24 58 595 | 7/1975 | |
| DE | 41 20 475 | 12/1992 | |
| DE | 102 16 290 | 11/2002 | |
| EP | 321335 | * 6/1989 | ............... 475/230 |
| JP | 2623705 | 4/1997 | |
| JP | 10-96461 | 4/1998 | |
| WO | WO 01/80414 | 11/2001 | |

OTHER PUBLICATIONS

English translation for Abstract of Japanese Patent No. JP1320352 published on Dec. 26, 1989 (1 page).
German Patent and Trademark Office, File No.: 10 2004 008 224.3-3-12, Office Action dated Sep. 7, 2005, including English translation thereof (7 pages).

* cited by examiner

*Primary Examiner*—Sherry Estremsky
(74) *Attorney, Agent, or Firm*—Osha Liang L.L.P.

(57) ABSTRACT

A junction at which the pinion shafts are connected to each other by themselves is formed in a portion of the rotational axis of an outer rotary member where the pinion shafts meet each other. Therefore, the positional relation of the pinion shafts without any substantial error is reliably secured and maintained, and the uniform transmission of power to the pinion shafts becomes possible. Accordingly, the number of parts is reduced, and it is not necessary to give any heat treatment to the clutch tooth or select any material of high strength therefor.

18 Claims, 10 Drawing Sheets

PRIOR ART

FIG. 5B

PRIOR ART

FIG. 5C

PRIOR ART

FIG. 5D

PRIOR ART

DIFFERENTIAL APPARATUS

BACKGROUND OF THE INVENTION

This invention relates to a differential apparatus having radially arranged pinion shafts rotatably supporting pinions disposed between and meshing with a pair of side gears.

This kind of differential apparatus, having radially arranged pinion shafts rotatably supporting pinions disposed between and meshing with a pair of side gears, is often used as a differential apparatus for a vehicle, since it is simple in construction and inexpensive. This kind of differential apparatus performs differential actions by bevel tooth engagement between a pair of side gears and pinions. Further, this kind of differential apparatus may perform the function of stopping those differential actions (differential lock: dif. lock) (see, for example, JP-A-10-096461), or stopping the transmission of power (cutting off power in a free running differential).

Figure 5A:
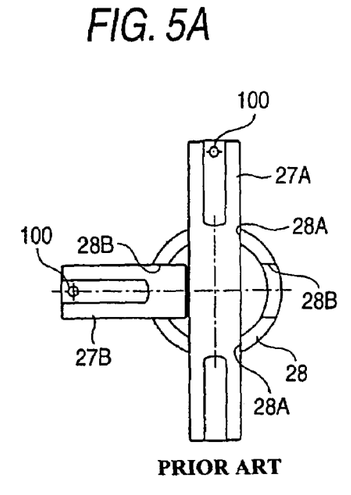
FIG. 5A, FIG. 5B, FIG. 5C and FIG. 5D show a differential apparatus according to the related art, and are cross sections of an arrangement of pinion shafts according to the related art.
Figure 5B:
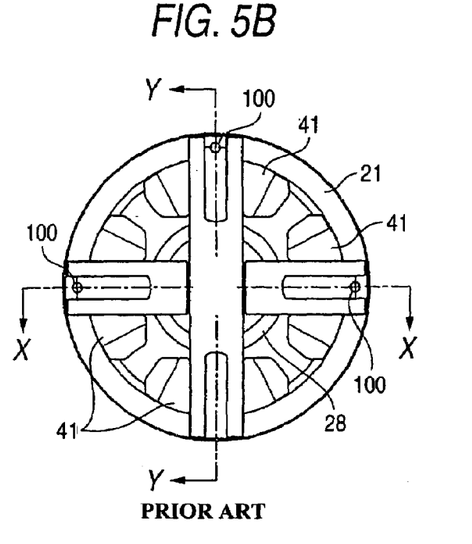
Figure 5C:
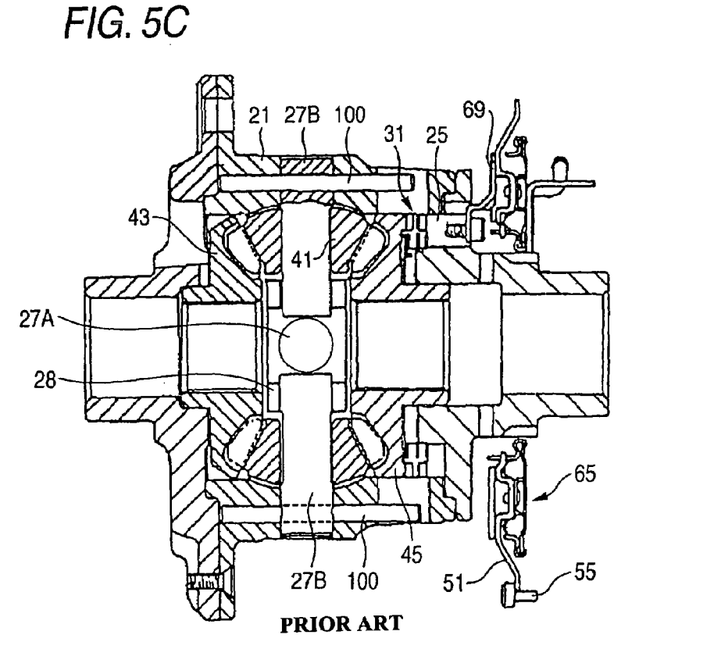
Figure 5D:
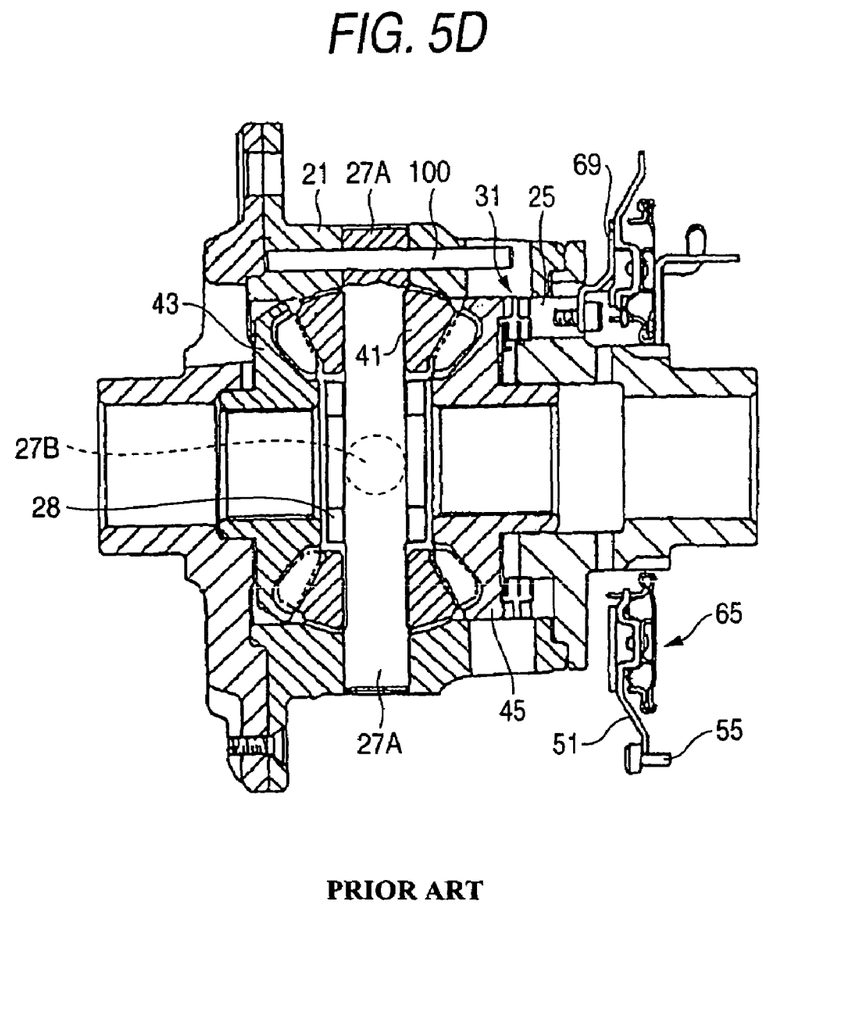

An example of a differential lock mechanism as disclosed in JP-A-10-096461 is described briefly with reference to FIG. 5C and FIG. 5D. The related differential apparatus includes a differential case 21, pinion shafts 27, pinions 41, side gears 43 and 45, a drive cam 25 disposed beside the side gear 45. The drive cam 25 has a dog clutch 31 between the side gear 45 and itself, and a pressing member 69 located inwardly of the outer periphery of the differential case 21 and adapted to press the drive cam 25 into movement upon operation of an actuator 65. In the related differential apparatus, a switch 55 engages the lower plate 51 of the actuator 65 for detecting a switchover in differential action of the actuator 65.

According to the related differential apparatus constructed as described in the above, a driving power from an engine is transmitted to the differential case 21, is differentially distributed to the side gears 43 and 45 through the pinion shafts 27 and the pinions 41 rotatably supported on the pinion shafts 27 and is transmitted to the right and left driving wheels (not shown). In the event that any excessive differential action is likely to occur from the wheel-spin of only one of the wheels, etc. when the vehicle has entered a bad road as in a muddy place, the actuator 65 is operated to cause the pressing member 69 to move the drive cam 25 axially to engage the dog clutch 31 to unite the side gear 45 and the differential case 21 into a differential lock, so that the vehicle may be able to leave the bad road.

In this related differential apparatus as described in the above, the pinion shafts 27 on which the four pinions 41 are rotatably supported, respectively, are usually mounted in a radial array in the differential case 21, as shown in FIG. 5A and FIG. 5B. The radial pinion shafts 27 comprise a diametrically disposed long pinion shaft 27A and short pinion shafts 27B disposed by a ring-shaped thrust block 28 at right angles to the long pinion shaft 27A. In order to dispose the short pinion shafts 27B at right angles to the long pinion shaft 27A, the related pinion shaft mounting structure has relied upon the aligning function of the thrust block 28, as in the case of the example shown. That is, the long pinion shaft 27A is mounted penetrating through a shaft hole 28A of the thrust block 28, and the short pinion shafts 27B are mounted penetrating through shaft holes 28B, the shaft holes 28B are perpendicular to the shaft hole 28A.

In the pinion shaft mounting structure employing the thrust block 28 as described, however, a stringent requirement for fitting accuracy has been made of the pinion shaft holes 28A and 28B in the thrust block 28. If fitting accuracy is low-between the pinion shaft holes 28A and 28B in the thrust block 28 and the pinion shafts 27, the short pinion shaft 27B is not definitely positioned in the pinion shaft hole 28B. Moreover, it is necessary for a high fitting accuracy to exist between the long pinion shaft 27A and the pinion shaft hole 28A in order to fix the thrust block 28 in position.

Further, it has been likely that the torque transmitted from the teeth of the dog clutch 31 may not be uniformly borne by the four pinion shafts, but may sometimes be borne by the long pinion shaft 27 alone, depending on the fitting accuracy between the pinion shaft holes 28A and 28B in the thrust block 28 and the pinion shafts 27A and 27B. In particular, an error is likely to be enlarged, since the positions of the pinion shaft holes 28A and 28B in the thrust block 28 are relatively far from the rotational axis, as shown in the drawing. Therefore, while a high working accuracy of the pinion shaft holes is required to avoid any uneven transmission of a load to the teeth on the dog clutch 31, the expensive and complicated heat treatment of the whole teeth or the selection of a material with high strength is required for coping with an uneven high load.

As a result, process steps are increased and extra parts are required for the thrust block, in addition, a freedom in the selection of materials is reduced.

SUMMARY OF THE INVENTION

It is, therefore, an object of this invention to solve the problems of the related differential apparatus as stated above. Further, the object is also to provide a differential apparatus which make it possible to obtain a high accuracy of installation while reducing the number of parts, and further to improve durability of the clutch teeth while uniformly transmit the power.

The object can be achieved by a differential apparatus according to the present invention comprising: pinion shafts; a rotary member; pinions; a pair of side gears; and a junction. The pinion shafts are radially arranged on the rotary member. The pinions are rotatably supported on the pinion shafts respectively. The pair of side gears are meshing with the pinions, and disposed coaxially with the rotary member. At the junction, the pinion shafts are connected to each other by themselves.

Further, according to this invention, the junction includes a first connecting wall that is formed between the adjacent pinion shafts, and the first connecting wall restricts the respective an axial movement of the pinion shafts relative to the other of the pinion shaft.

Further, according to this invention, the junction includes a second connecting wall that is formed between the adjacent pinion shafts, and the second connecting wall restricts an rotational movements of the pinion shafts relative to the other of the pinion shaft.

Further, according to this invention, the pinion shafts are formed symmetry to a rotational axis of the rotary member.

Further, the pinion shafts comprises a long pinion shaft and a short pinion shaft connected with the long pinion shaft at right angles thereto.

Further, according to this invention, the long pinion shaft includes a concave portion, and these are the means for solving the problems.

BRIEF DESCRIPTION OF THE DRAWINGS

FIG. 1A, FIG. 1B, FIG. 1C and FIG. 1D show a differential apparatus according to a first embodiment of this invention.

DETAILED DESCRIPTION OF THE PREFERRED EMBODIMENTS

Embodiments of the differential apparatus according to this invention will now be described in detail with reference to the drawings.

(First Embodiment)

Figure 1A:
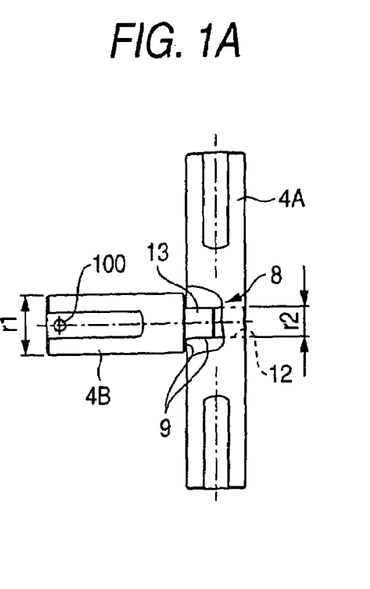
FIG. 1A shows a junction of pinion shafts.
Figure 1B:
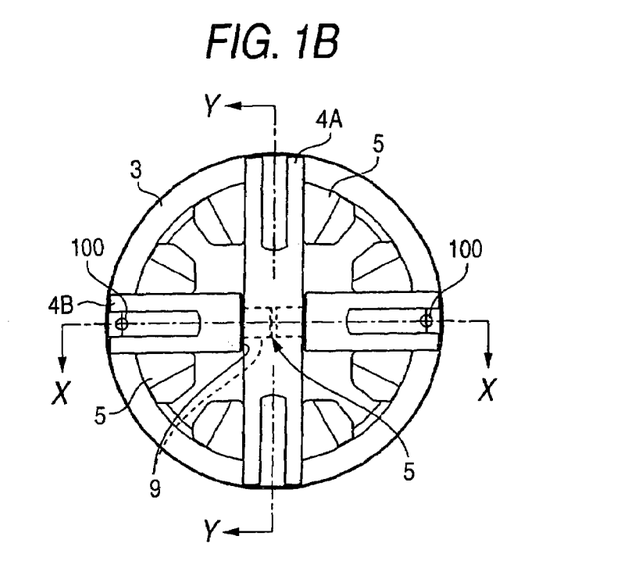
FIG. 1B is a cross sectional view showing the pinion shafts and pinions as attached to an inner differential as an inner rotary member.
Figure 1C:
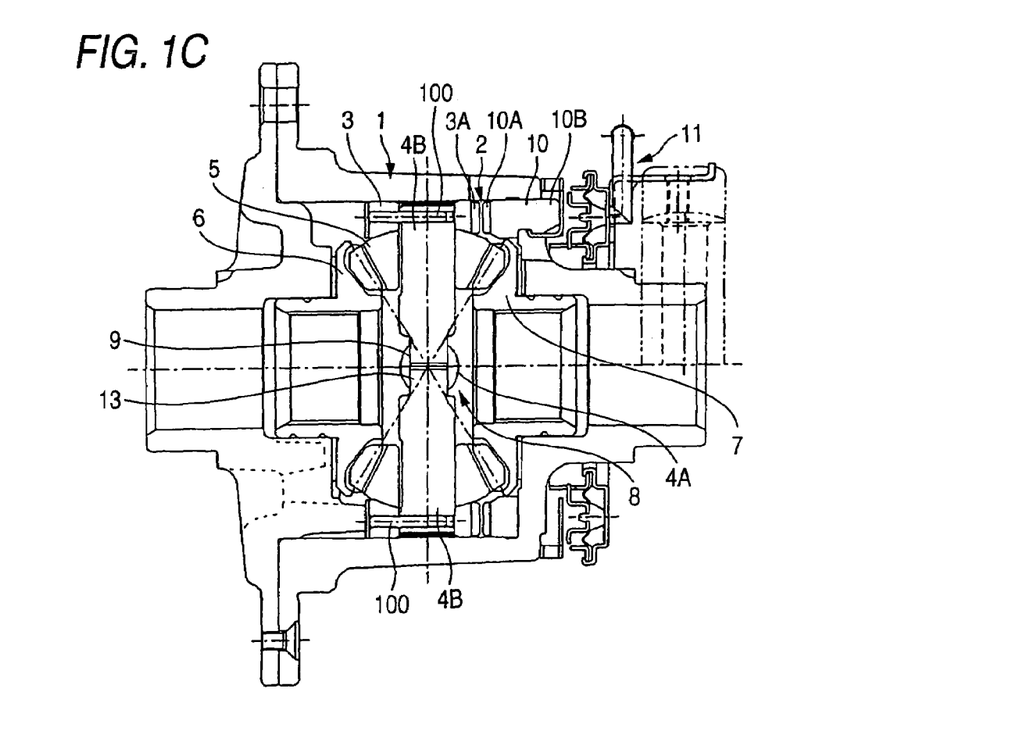
FIG. 1C is an overall sectional view of the differential apparatus that is taken along a line X—X of FIG. 1B.
Figure 1D:
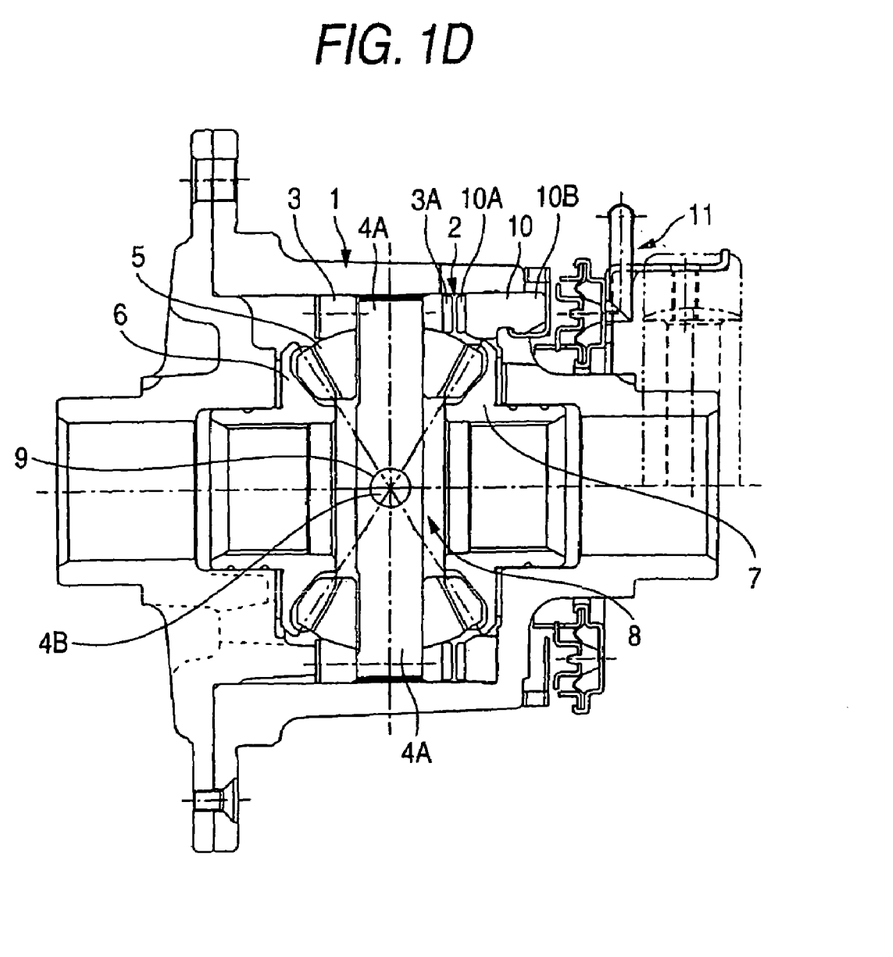
FIG. 1D is an overall sectional view of the differential apparatus that is taken along a line Y—Y of FIG. 1B.

FIG. 1A, FIG. 1B, FIG. 1C and FIG. 1D show the differential apparatus according to a first embodiment of this invention, and FIG. 1A shows a junction of pinion shafts, FIG. 1B is a cross sectional view showing the pinion shafts and pinions as attached to an inner differential as an inner rotary member, FIG. 1C is an overall sectional view of the differential apparatus that is taken along a line X—X of FIG. 1B, and FIG. 1D is an overall sectional view of the differential apparatus that is taken along Y—Y of FIG. 1B. This embodiment is one example wherein this invention is applied to a free running differential. In the free running differential it is possible, by the engagement or disengagement of a clutch tooth, to achieve a two-wheel drive mode without transmitting a rotary driving force from a differential case to a differential mechanism comprising a differential gear, or a four-wheel drive mode by transmitting it.

More specifically, as shown in FIG. 1C and FIG. 1D, the differential apparatus according to this embodiment comprises: pinion shafts 4 (4A and 4B); an inner rotary member 3 as an inner differential; an outer rotary member 1 as a differential case; a clutch tooth 2; a pinion 5; pinion shaft 4A or 4B; a pair of side gears 6 and 7; a junction 8; and a uniform power transmitting portion 9. The pinion shafts 4 (4A and 4B) are arranged radially on the inner rotary member 3. The inner rotary member 3 is movably fitted in the outer rotary member 1 in a way capable of being connected therewith and disconnected therefrom by the clutch tooth 2. The pinion 5 is rotatably supported on the pinion shafts 4A and 4B respectively. The pair of side gears 6 and 7 are meshing with the pinions 5 on both sides thereof, and disposed coaxially with the outer rotary member. At the junction 8, the pinion shafts 4A and 4B are connected to each other by themselves, and the junction 8 is formed in that portion of a rotational axis of the rotary member where the radial pinion shafts 4A and 4B meet each other. The uniform power transmitting portion 9 is formed in the junction 8, and transmits a transmitted torque from the outer rotary member 1 to the clutch tooth 2 uniformly.

A detailed description will now be made. The differential apparatus of this embodiment is structurally based on the most basic pinion type differential gear. As shown in FIG. 1C, an inner differential 3 as the inner rotary member is coaxially and rotatably fitted in a differential case 1 as the outer rotary member. The differential case 1 is formed by fastening two axially split casing portions together. The long pinion shaft 4A is radially fitted on the diameter of the inner differential 3 at right angles to a rotational axis of the differential case 1. The pinions 5 are fitted and rotatably supported on the long pinion shaft 4A, as shown in FIG. 1B. The long pinion shaft 4A has a hole 12 made in its axially central portion. A projection 13 is formed on the short pinion shaft 4B, in which a diameter of the projection 13: r2 is smaller than a diameter of the short pinion shaft 4B: r1 (r1>r2). The projection 13 fits in the hole 12, as will be described. Therefore, a direction of the hole 12 is perpendicular to the longitudinal direction of the long pinion shaft 4A.

Then, the short pinion shafts 4B are fitted in the inner differential 3 at right angles to the long pinion shaft 4A. And, the short pinion shafts 4B and the inner differential 3 are fixed by pins 100. The pinions 5 are fitted and rotatably supported on the short pinion shaft 4B. The projections 13 formed on the axial end of the respective short pinion shafts 4B are inserted in the hole 12 made in the axially central portion of the long pinion shaft 4A, as shown in FIG. 1A, whereby the pinion shafts 4A and 4B are connected to each other. The direct connection by insertion of the hole 12 in the long pinion shaft 4A and the projection 13 on the short pinion shaft 4B forms a junction 8 of high accuracy. The highly accurate and complementary fitting thereof at the junction 8 makes it possible to ensure and maintain the accuracy of direct perpendicular connection between the long and short pinion shafts 4A and 4B. Since the junction 8 is located at the center of rotation, the maintenance of accuracy becomes easier.

In the junction 8 as described, the proper fitting surfaces between the hole 12 and the projection 13, and the surface where a shoulder formed between the short pinion shaft 4B and its projection 13 contacts the outer periphery of the long pinion shaft 4A, constitute a uniform power transmitting portion 9. At the portion 9, the surfaces work together to ensure and maintain the reliable position of perpendicular connection between the long and short pinion shafts 4A and 4B, to enable the uniform transmission of power to the long and short pinion shafts 4A and 4B.

Since the long and short shafts 4A and 4B are connected at the junction in the above described manner, in the junction 8, a first connecting wall is formed between the hole 12 and the projection 13. By the first connecting wall, an axial movement of the long pinion shaft 4A is restricted. Even if the long pinion shaft 4A is only fitted and is not fixed to the inner differential 3 by any additional parts, the long pinion shaft 4A does not move in its axial direction, by the restriction of the first connecting wall. Therefore, it is not necessary to fix the long pinion shaft 4A to the inner differential 3 by pins or the like. Accordingly, a number of the parts and manufacturing processes are reduced.

Further, the long and short shafts 4A and 4B are connected at the junction in the above described manner, therefore in the junction 8, a second connecting wall is formed between the hole 12 and the projection 13. By the second connecting wall, a rotational movement of the long pinion shaft 4A is restricted. Even if the long pinion shaft 4A is only fitted and is not fixed to the inner differential 3 by any additional parts, the long pinion shaft 4A does not move in its rotational direction, by the restriction of the second connecting face. Therefore, it is not necessary to fix the long pinion shaft 4A to the inner differential 3 by pins or the like. Accordingly, a number of the parts and manufacturing processes are reduced.

Further, the long pinion shaft 4A and the short pinion shafts 4B are formed symmetry to the rotational axis of the outer differential 1. Therefore, the long and short pinion shafts 4A and 4B may be assembled to the inner differential 3 without any directional character. Accordingly, the manufacturing efficiency becomes increased, and a number of parts are reduced.

Since the long pinion shaft 4A includes the hole 12, a rigidity of the long pinion shaft 4A at the junction 8 is decreased. Accordingly, the difference between the torque loaded to the long pinion shaft 4A and the torque loaded to the short pinion shafts 4B is reduced.

Further, as no uneven load bears upon any particular part of the clutch tooth 2, it is not necessary to give any expensive and complicated heat treatment to the clutch tooth or select any material of high strength therefor.

A first and a second side gear 6 and 7 are situated coaxially with the rotational axis of the differential case 1 in bevel tooth engagement with the pinions 5 on both sides of their axis. A dog tooth 3A defining the clutch tooth is formed on one side of the inner differential 3. A clutch ring 10 having a dog tooth 10A formed opposite the dog tooth 3A is situated on the inside of the differential case 1. An operating protrusion 10B is formed on the opposite side of the clutch ring 10 and projects outwardly through several holes made on the circumference of the side of the differential case 1. The operating protrusion 10B advances when pressed in sliding contact by the expansion, etc. of a diaphragm in a pneumatic actuator 11 situated in a stationary portion and makes it possible by the engagement of the clutch tooth 2 to transmit a rotary driving force from the differential case 1 to the inner differential 3 which is normally disconnected therefrom.

(Second Embodiment)

Figure 2A:
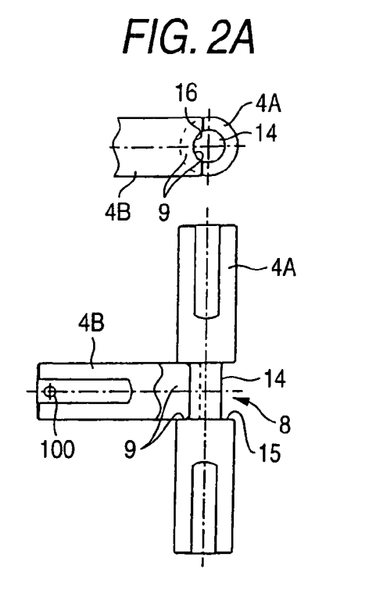
FIG. 2A, FIG. 2B, FIG. 2C and FIG. 2D show a differential apparatus according to a second embodiment of this invention.
Figure 2B:
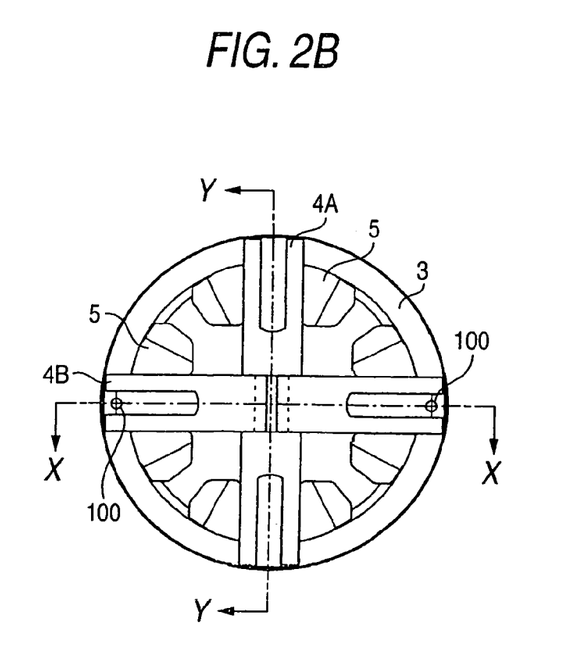
Figure 2C:
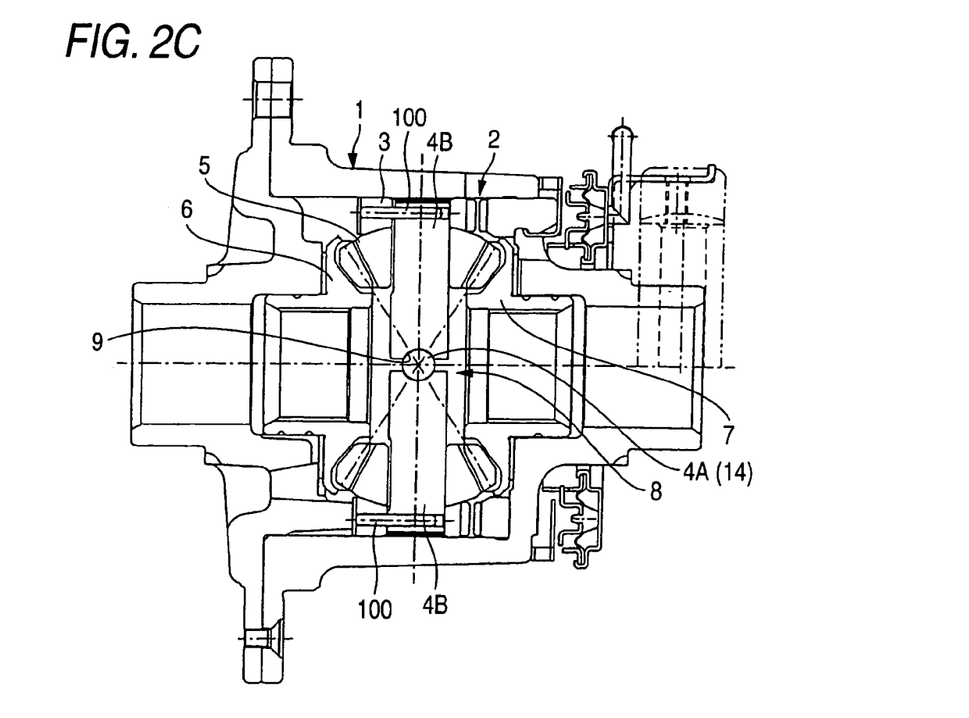
Figure 2D:
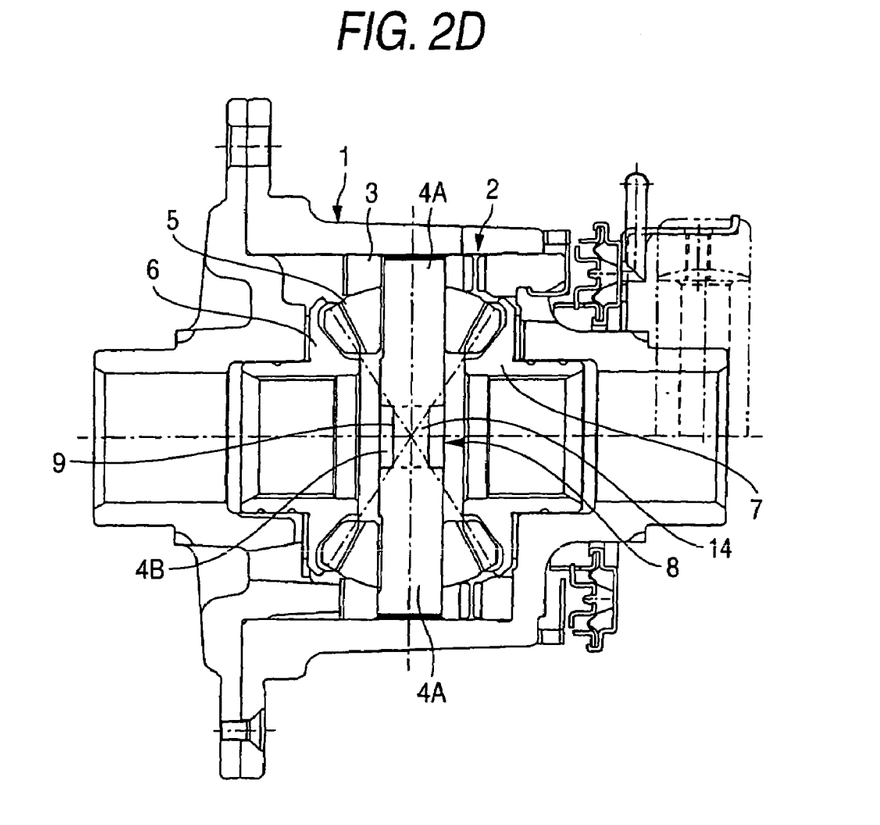

FIG. 2A; FIG. 2B, FIG. 2C and FIG. 2D show a differential apparatus according to a second embodiment of this invention. According to this embodiment, a junction 8 in the center of rotation between a long pinion shaft 4A and short pinion shafts 4B comprises, a small diameter portion 14 and an arcuate groove 16, as shown in FIG. 2A. The small diameter portion 14 is formed in the mid-portion of the long pinion shaft 4A. The arcuate groove 16 is formed in the axial end of the short pinion shaft 4B. The arcuate groove 16 contacts the peripheral surface of the small diameter portion 14 in a complementary fashion. The long pinion shaft 4A is fitted in the inner differential 3, and the short pinion shafts 4B are fitted in the inner differential 3 at right angles to the long pinion shaft 4A. And, the short pinion shafts 4B and the inner differential 3 are fixed by pins 100. Accordingly, a uniform power transmitting portion 9 for ensuring and maintaining the perpendicular arrangement of the long and short pinion shafts 4A and 4B in the junction 8 is formed between the peripheral surface of the short diameter portion 14 of the long pinion shaft 4A and the arcuate groove 16 of the short pinion shaft 4B and between the shoulders 15 of the small diameter portion 14 of the long pinion shaft 4A and the peripheral surface of the short pinion shaft 4B.

Thus, the uniform power transmitting portion 9 is formed in a relatively large area by utilizing the peripheral surface and diametrical portion of the short pinion shaft, and can more reliably ensure and maintain the perpendicular arrangement of the long and short pinion shafts 4A and 4B.

Since the long and short shafts 4A and 4B are connected at the junction 8 in the above described manner, in the junction 8, a first connecting wall is formed between the small diameter portion 4 and the arcuate groove 16. By the first connecting wall, an axial movements of the long pinion shaft 4A is restricted. Even if the long pinion shaft 4A is only fitted and is not fixed to the inner differential 3 by any additional parts, the long pinion shaft 4A does not move in its axial direction, by the restriction of the first connecting wall. Therefore, it is not necessary to fix the long pinion shaft 4A to the inner differential 3 by pins or the like. Accordingly, a number of the parts and manufacturing processes are reduced.

The long pinion shaft 4A and the short pinion shafts 4B are formed symmetry to a rotational axis of the outer differential 1. Therefore, the long and short pinion shafts 4A and 4B can be assembled to the inner differential 3 without any directional character. Accordingly, the manufacturing efficiency becomes increased, and a number of parts are reduced.

Since the long pinion shaft 4A includes the small diameter portion 14, a rigidity of the long pinion shaft 4A at the junction 8 is decreased. Accordingly, the difference between the torque loaded to the long pinion shaft 4A and the torque loaded to the short pinion shafts 4B is reduced.

Further, a load bearing upon a clutch tooth 2 (see FIG. 2C) at the time of engagement can be caused to be borne uniformly by the long and short pinion shafts 4A and 4B, so that no uneven load may bear upon any particular part of the clutch tooth 2, and it is, therefore, not necessary to give any expensive and complicated heat treatment to the clutch tooth or select any material of high strength therefor.

(Third Embodiment)

FIG. 3A, FIG. 3B, FIG. 3C and FIG. 3D show a differential apparatus according to a third embodiment of this invention. According to this embodiment, a junction 8 in the center of rotation between a long pinion shaft 4A and short pinion shafts 4B comprises a pair of grooves 17 formed back to back in the mid-portion of the long pinion shaft 4A for receiving the outside diameter of the short pinion shaft 4B therein in a complementary way. The grooves 17 include bottom surfaces, respectively. Axial end surfaces of the short pinion shafts 4B contact with the bottom surfaces of the grooves 17 of the long pinion shaft 4A. The long pinion shaft 4A is fitted in the inner differential 3, and the short pinion shafts 4B are fitted in the inner differential 3 at right angles to the long pinion shaft 4A. And, the short pinion shafts 4B and the inner differential 3 are fixed by pins 100. Accordingly, a uniform power transmitting portion 9 for ensuring and maintaining the perpendicular arrangement of the long and short pinion shafts 4A and 4B in the junction 8 is formed by the peripheral and bottom surfaces of the grooves 17 of the long pinion shaft 4A and the peripheral and axial end surfaces of the short pinion shafts 4B fitted in the grooves 17.

Figure 3A:
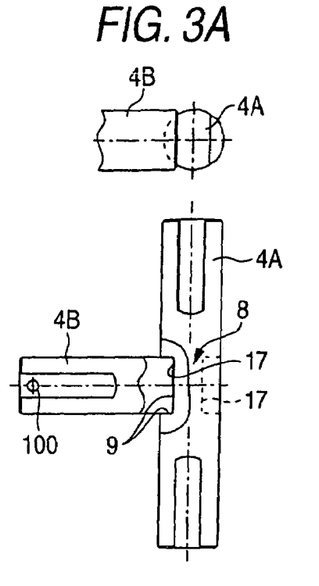
FIG. 3A, FIG. 3B, FIG. 3C and FIG. 3D show a differential apparatus according to a third embodiment of this invention.
Figure 3B:
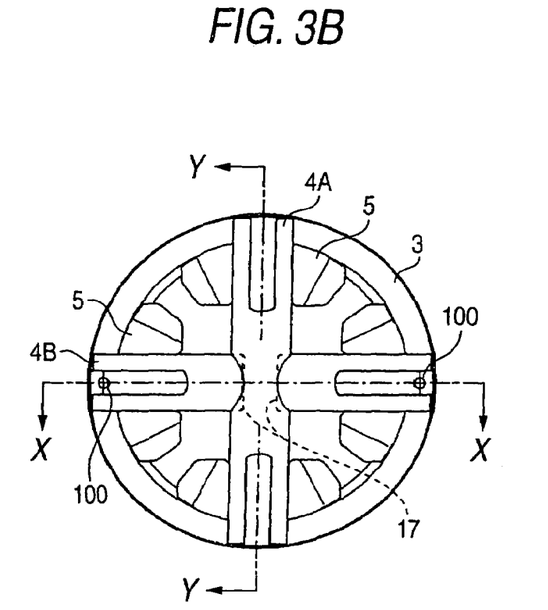
Figure 3C:
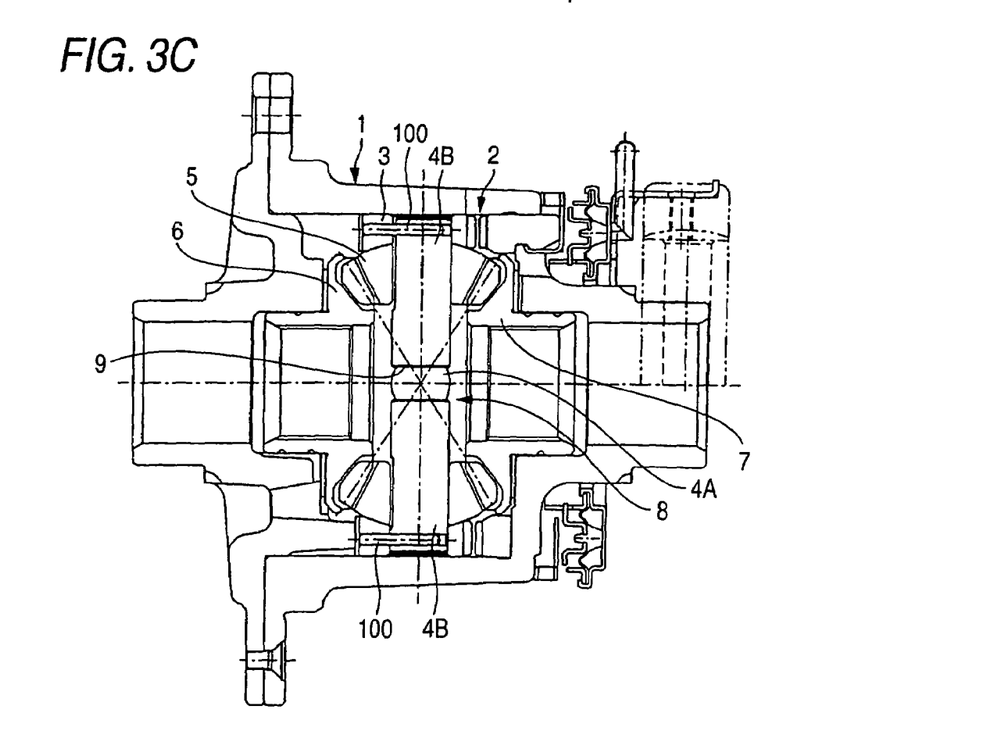
Figure 3D:
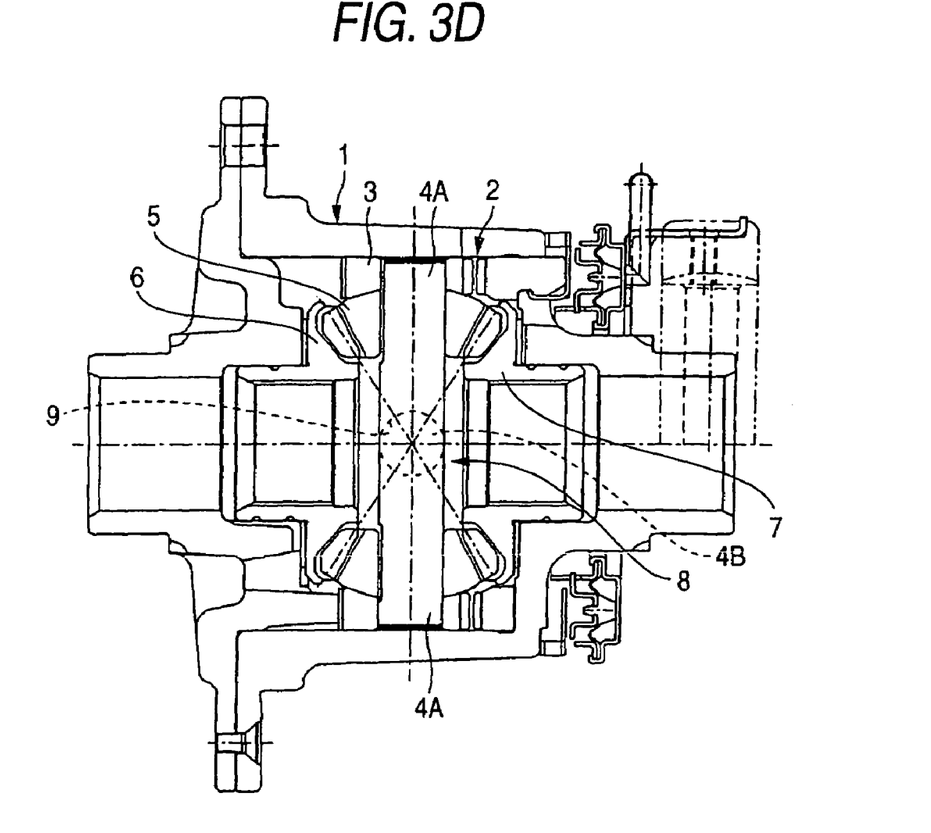

Thus, the uniform power transmitting portion 9 is formed in a still larger area by utilizing the whole peripheral and end surfaces of the short pinion shaft 4B, and can still more reliably ensure and maintain the perpendicular arrangement of the long and short pinion shafts 4A and 4B.

Further, since the long and short pinion shafts 4A and 4B are connected at the junction 8 in the above described manner, therefore, in the junction 8, a first connecting wall is formed between the grooves 17 and the axial end of the short pinion shaft 4B. By the first connecting wall, an axial movements of the long pinion shaft 4A is restricted. Even if the long pinion shaft 4A is only fitted and is not fixed to the inner differential 3 by any additional parts, the long pinion shaft 4A does not move in its axial direction, by the restriction of the first connecting wall. Therefore, it is not necessary to fix the long pinion shaft 4A to the inner differential 3 by pins or the like. Accordingly, a number of the parts and manufacturing processes are reduced.

Further, the long and short shafts 4A and 4B are connected at the junction in the above described manner, therefore in the junction 8, a second connecting wall is formed between the bottom surface of the grooves 17 and the axial end surfaces of the short pinion shafts 4B. By the second connecting wall, a rotational movements of the long pinion shaft 4A is restricted. Even if, the long pinion shaft 4A is only fitted and is not fixed to the inner differential 3 by any additional parts, the long pinion shaft 4A does not move in its rotational direction, by the restriction of the second connecting face. Therefore, it is not necessary to fix the long pinion shaft 4A to the inner differential 3 by pins or the like. Accordingly, a number of the parts and manufacturing processes are reduced.

The long and short pinion shafts 4A and 4B are formed symmetry to a rotational axis of the outer differential 1. Therefore, the long and short pinion shafts 4A and 4B can be assembled to the inner differential 3 without any directional character. Accordingly, the manufacturing efficiency becomes increased, and a number of parts are reduced.

Since the long pinion shaft 4A includes the grooves 17, a rigidity of the long pinion shaft 4A at the junction 8 is decreased. Accordingly, the difference between the torque loaded to the long pinion shaft 4A and the torque loaded to the short pinion shafts 4B is reduced.

Further, a load bearing upon a clutch tooth 2 (see FIG. 3C) at the time of engagement is uniformly borne, by the long and short pinion shafts 4A and 4B, more certainly. And therefore, no uneven load may bear upon any particular part of the clutch tooth 2. Accordingly, it is not necessary to give any expensive and complicated heat treatment to the clutch tooth or select any material of high strength therefor.

(Forth Embodiment)

FIG. 4A, FIG. 4B, FIG. 4C and FIG. 4D show a differential apparatus according to a forth embodiment of this invention. This embodiment is one example where in this invention is applied to a differential lock differential. The differential apparatus according to this embodiment comprising: pinion shafts 4A and 4B; a differential case 1 as an outer rotary member; a pinion 5; a pair of side gears 6 and 7; a clutch tooth 131; a junction 8; a uniform power transmitting portion 9. The pinion shafts 4A and 4B are arranged radially on the differential case 1. The pinion 5 is rotatably supported on each pinion shaft 4A and 4B. The pair of side gears 6 and 7 are meshing with the pinions 5 on both sides thereof, and disposed coaxially with the differential case 1, in a way capable of being connected with the differential case 1 and disconnected therefrom by the clutch tooth 131. At the junction 8, the pinion shafts 4A and 4B are connected to each other by themselves. The junction 8 is formed in that portion of a rotational axis of the differential case 1 where the radial pinion shafts 4A and 4B meet each other. The uniform power transmitting portion is formed in the junction 8, and transmits a transmitted torque from the outer rotary member to the clutch tooth uniformly.

Figure 4A:
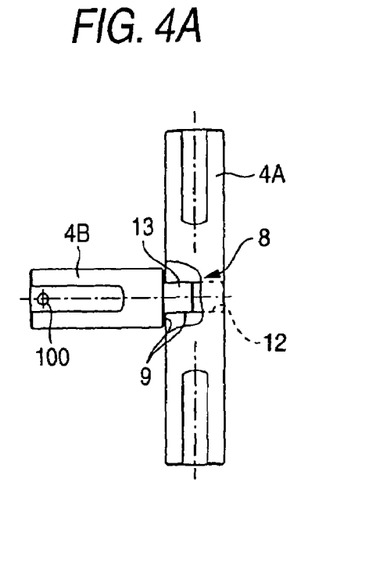
FIG. 4A, FIG. 4B, FIG. 4C and FIG. 4D show a differential apparatus according to a fourth embodiment of this invention.
Figure 4B:
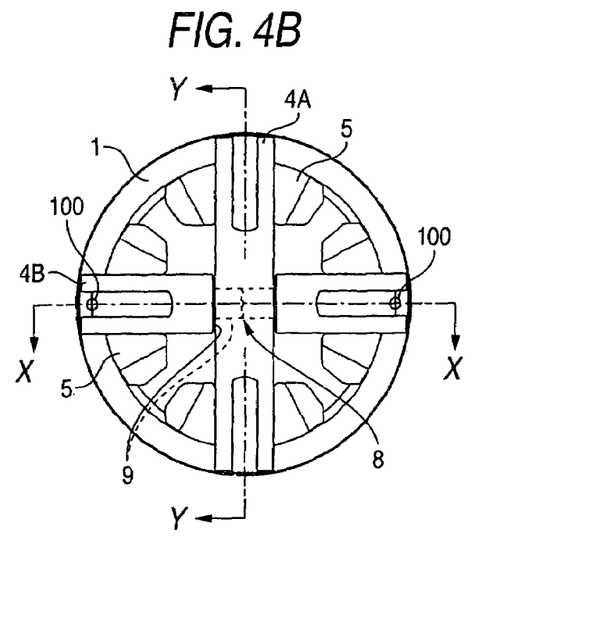
Figure 4C:
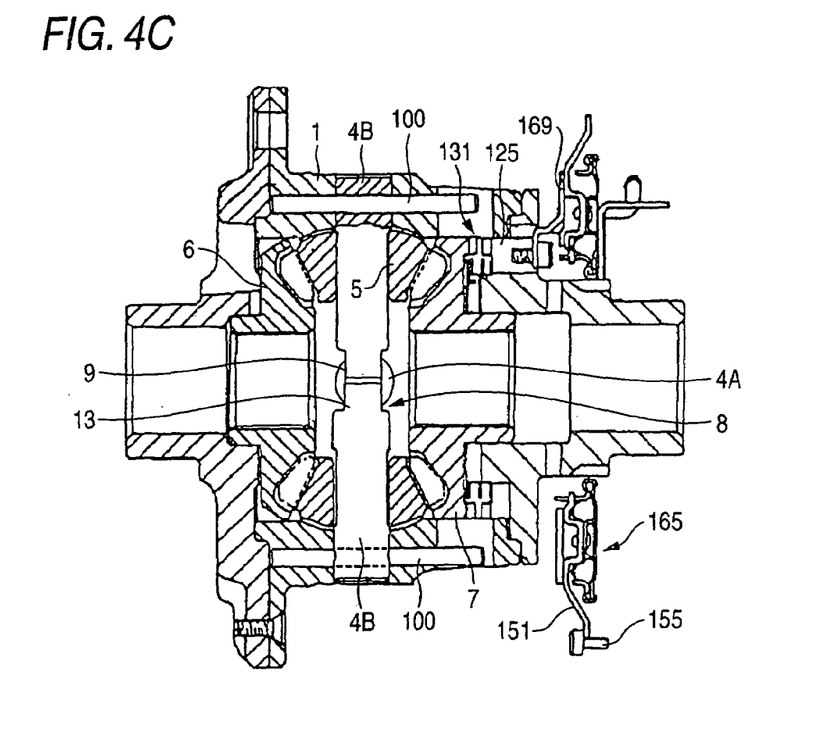
Figure 4D:
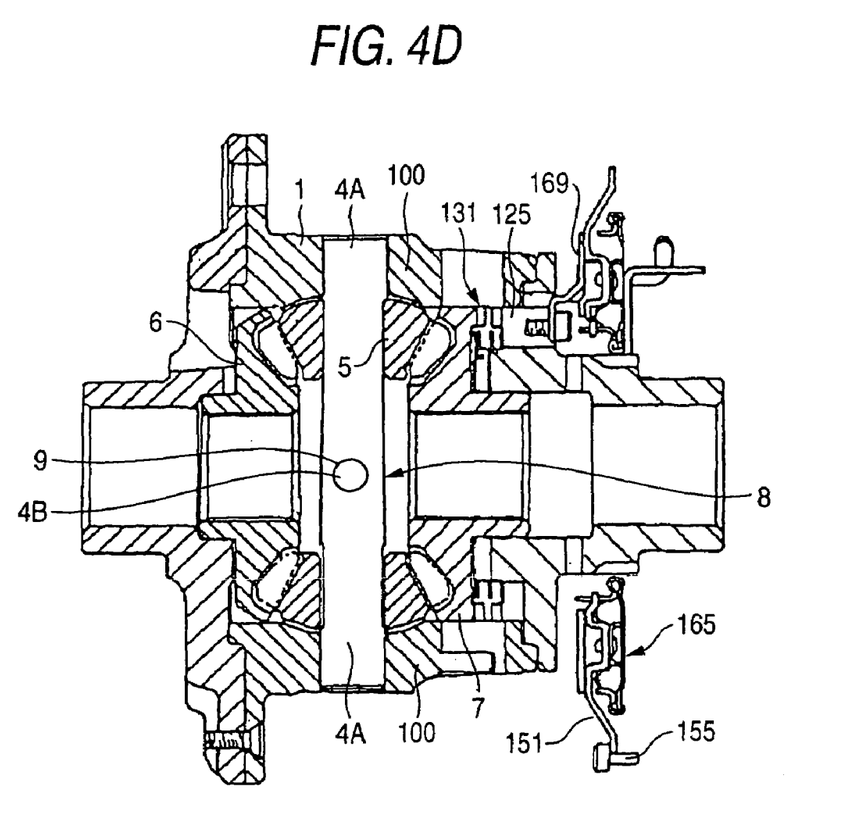

The long pinion shaft 4A has a hole 12 made in its axially central portion. A projection 13 is formed on the short pinion shaft 4B, and fits in the hole 12. The projections 13 formed on the axial end of the respective short pinion shafts 4B are inserted in the hole 12 made in the axially central portion of the long pinion shaft 4A, as shown in FIG. 4B, whereby the pinion shafts 4A and 4B are connected to each other, in the same structure of connection as has been described with reference to FIG. 1A and FIG. 1B.

The direct connection by insertion of the projections 13 on the short pinion shafts 4B to the hole 12 in the long pinion shaft 4A forms the junction 8 of high accuracy. The highly accurate and complementary fitting thereof at the junction 8 makes it possible to ensure and maintain the accuracy of direct perpendicular connection between the long and short pinion shafts 4A and 4B. Since the junction 8 is located at the center of rotation, the maintenance of accuracy becomes easier.

Since the long and short shafts 4A and 4B are connected at the junction in the above described manner, therefore, in the junction 8, a first connecting wall is formed between the hole 12 and the projection 13. By the first connecting wall, an axial movement of the long pinion shaft 4A is restricted. Even if the long pinion shaft 4A is only fitted and is not fixed to the differential case 1 by any additional parts, the long pinion shaft 4A does not move in its axial direction, by the restriction of the first connecting wall. Therefore, it is not necessary to fix the long pinion shaft 4A to the inner differential 3 by pins or the like. Accordingly, a number of the parts and manufacturing processes are reduced.

Further, the long and short shafts 4A and 4B are connected at the junction in the above described manner, therefore in the junction 8, a second connecting wall is formed between the hole 12 and the projection 13. By thee second connecting wall, a rotational movements of the long pinion shaft 4A is restricted. Even if the long pinion shaft 4A is only fitted and is not fixed to the differential case 1 by any additional parts, the long pinion shaft 4A does not move in its rotational direction, by the restriction of the second connecting face. Therefore, it is not necessary to fix the long pinion shaft 4A to the inner differential 3 by pins or the like. Accordingly, a number of the parts and manufacturing processes are reduced.

The long and short pinion shafts 4A and 4B are formed symmetry to a rotational axis of the outer differential 1. Therefore, the long and short pinion shafts 4A and 4B can be assembled to the inner differential 3 without any directional character. Accordingly, the manufacturing efficiency becomes increased, and a number of parts are reduced.

Since the long pinion shaft 4A includes the hole 12, a rigidity of the long pinion shaft 4A at the junction 8 is decreased. Accordingly, the difference between the torque loaded to the long pinion shaft 4A and the torque loaded to the short pinion shafts 4B is reduced.

Instead of the above described connection between the long and short pinion shafts 4A and 4B, the differential apparatus according to this embodiment can adopt the same structure of connection as has been described with reference to FIGS. 2A to 2D and FIGS. 3A to 3D.

This embodiment makes it still more certain that a load bearing upon a clutch tooth at the time of a differential lock be borne uniformly by the long and short pinion shafts. Therefore, no uneven load may bear upon any particular part of the clutch tooth. Accordingly, it is not necessary to give any expensive and complicated heat treatment to the clutch tooth or select any material of high strength therefor.

While the invention have been described by way of embodiments, it is possible to select any appropriate alternatives within the scope of the spirit of this invention. For example, the followings are selectable:

the shape of the differential apparatus including the mode of engagement between pinions and side gears;

the type of the differential apparatus (not only the four pinion type having a combination of long and short pinion shafts crossing each other at right angles, but also the three-forked pinion shaft type having a crossing junction with an angle of 120° at the center of rotation);

the shape and type of usual differential, free running differential or differential lock differential;

the shape of the clutch tooth;

the type of the clutch tooth (not only a dog tooth, but also any other adequate engaging tooth; or friction type);

the mode of clutch tooth engagement and disengagement by a clutch ring, etc.;

the shape of the uniform power transmitting portion in the junction;

the shape of the actuator the type of the actuator (such as pneumatic hydraulic, electrical or mechanical, or a combination thereof); and the place of installation where the actuator is installed.

According to this invention, a differential apparatus comprises: pinion shafts; a rotary member; a pinion; a pair of side gears and a junction. The pinion shafts are radially arranged on the rotary member. The pinions are rotatably supported on the pinion shafts respectively. The pair of side gears are meshing with the pinions, and disposed coaxially with the outer rotary member. At the junction, the pinion shafts are connected to each other by themselves.

As described above in detail, the pinion shafts cross each other at that portion of the rotational axis where the pinion shafts meet each other, the positional relation of the pinion shafts is reliably secured and maintained without any substantial error. Further, since any additional parts like a thrust block are not required, it becomes possible to reduce the number of parts, and further, it becomes possible to assemble the differential apparatus efficiently.

Further, it becomes possible to transmit power to the pinion shafts uniformly. Since no uneven load bears upon any particular part of the clutch tooth when a rotary driving force is connected from the outer rotary member to the inner rotary member; it is not necessary to give any expensive and complicated heat treatment to the clutch tooth or select any material of high strength therefor.

According to this invention, in another aspect, a first connecting wall is formed in the junction between the adjacent pinion shafts. Since the first connecting wall restricts an axial movement of one of the pinion shafts relative to the other of the pinion shafts, any additional parts for restricting the axial movement of one of the pinion shaft, such as pins or the like, are not required. Accordingly, a number of the parts and manufacturing processes are reduced.

According to this invention, in another aspect, a second connecting wall is formed in the junction between the adjacent pinion shafts. Since the second connecting wall restricts a rotational movement of one of the pinion shafts relative to the other of the pinion shaft, any additional parts for restricting the rotational movement of the pinion shafts, such as pins or the like, are not required. Accordingly, a number of the parts and manufacturing processes are reduced.

According to this invention, in another aspect, the pinion shafts are formed symmetry to a rotational axis of the rotary member. Therefore, the pinion shafts can be assembled to the rotary member without any directional character. Accordingly, the manufacturing efficiency becomes increased, and a number of parts are reduced.

According to this invention, in another aspect, the pinion shafts comprise a long pinion shaft and a short pinion shaft connected with the long pinion shaft at right angles thereto, and a concave portion, such like a hole, a small diameter portion, or a groove, is formed in the long pinion shaft. Therefore, a rigidity of the long pinion shaft at the junction is decreased. Accordingly, the difference between the torque loaded to the long pinion shaft and the torque loaded to the short pinion shafts is reduced.

What is claimed is:

1. A differential apparatus, comprising:
   pinion shafts radially arranged on a rotary member, wherein the pinion shafts comprise:
   a long pinion shaft, and
   two short pinion shafts respectively connected with the long pinion shaft at right angles thereto;
   pinions rotatably supported on the pinion shafts respectively;
   a pair of side gears meshing with the pinions, and disposed coaxially with the rotary member; and
   a junction, at which the pinion shafts are connected to each other by themselves,
   wherein the long pinion shaft has a hole, and said short pinion shafts have projections formed on respective axial ends of the short pinion shafts, and wherein the projections are inserted in the hole so that the long pinion shaft and the short pinion shafts are connected to each other.

2. The differential apparatus according to claim 1,
   wherein the junction includes a first connecting wall that is formed between the pinion shafts being adjacent to each other in a rotational direction of the rotary member, and the first connecting wall restricts an axial movement of one of the pinion shafts relative to the other of the pinion shafts, and
   wherein the junction includes a second connecting wall that is formed between the pinion shafts being adjacent to each other in a rotational direction of the rotary member, and the second connecting wall restricts a rotational movement of one of the pinion shafts relative to the other of the pinion shafts.

3. The differential apparatus according to claim 1, wherein at least one of the pinion shafts is formed symmetrically to a rotational axis of the rotary member.

4. The differential apparatus according to claim 1,
   wherein the rotary member includes an outer rotary member and an inner rotary member,
   the inner rotary member is movably fitted in the outer rotary member and capable of being connected with and disconnected from the outer rotary member by a clutch tooth, and
   the pinion shafts are radially arranged on the inner rotary member.

5. The differential apparatus according to claim 1, wherein a clutch tooth is provided on at least one of the side gears and capable of being connected with and disconnected from the rotary member.

6. The differential apparatus according to claim 1, wherein said two short pinion shafts have a common configuration.

7. A differential apparatus, comprising:
   pinion shafts radially arranged on a rotary member, wherein the pinion shafts comprise:
   a long pinion shaft, and
   a short pinion shaft connected with the long pinion shaft at a right angle thereto;

pinions rotatably supported on the pinion shafts respectively;

a pair of side gears meshing with the pinions, and disposed coaxially with the rotary member; and a junction, at which the pinion shafts are connected to each other by themselves, wherein the long pinion shaft has a small diameter portion, and the short pinion shaft has an arcuate groove formed at its axial end, and wherein the arcuate groove contacts a peripheral surface of the small diameter portion.

8. The differential apparatus according to claim 7, wherein the junction includes a first connecting wall that is formed between the pinion shafts being adjacent each other in a rotational direction of the rotary member, and the first connecting wall restricts an axial movement of one of the pinion shafts relative to the other of the pinion shafts, and wherein the junction includes a second connecting wall that is formed between the pinion shafts being adjacent each other in a rotational direction of the rotary member, and the second connecting wall restricts a rotational movement of one of the pinion shafts relative to the other of the pinion shafts.

9. The differential apparatus according to claim 7, wherein at least one of the pinion shafts is formed symmetrically to a rotational axis of the rotary member.

10. The differential apparatus according to claim 7, wherein the rotary member includes an outer rotary member and an inner rotary member, the inner rotary member is movably fitted in the outer rotary member and capable of being connected with and disconnected from the outer rotary member by a clutch tooth, and the pinion shafts are radially arranged on the inner rotary member.

11. The differential apparatus according to claim 7, wherein a clutch tooth is provided on at least one of the side gears and capable of being connected with and disconnected from the rotary member.

12. A differential apparatus, comprising:

pinion shafts radially arranged on a rotary member, wherein the pinion shafts comprise:

a long pinion shaft, and two short pinion shafts respectively connected with the long pinion shaft at right angles thereto;

pinions rotatably supported on the pinion shafts respectively;

a pair of side gears meshing with the pinions, and disposed coaxially with the rotary member; and a junction, at which the pinion shafts are connected to each other by themselves, wherein a pair of grooves, including bottom surfaces, are formed in the long pinion shaft, and wherein the bottom surfaces of the pair of grooves contact axial end surfaces of the short pinion shafts, and each of the axial end surfaces of the short pinion shafts has a circular shape.

13. The differential apparatus according to claim 12, wherein the junction includes a first connecting wall that is formed between the pinion shafts being adjacent each other in a rotational direction of the rotary member, and the first connecting wall restricts an axial movement of one of the pinion shafts relative to the other of the pinion shafts, and wherein the junction includes a second connecting wall that is formed between the pinion shafts being adjacent each other in a rotational direction of the rotary member, and the second connecting wall restricts a rotational movement of one of the pinion shafts relative to the other of the pinion shafts.

14. The differential apparatus according to claim 12, wherein at least one of the pinion shafts is formed symmetrically to a rotational axis of the rotary member.

15. The differential apparatus according to claim 12, wherein the rotary member includes an outer rotary member and an inner rotary member, the inner rotary member is movably fitted in the outer rotary member and capable of being connected with and disconnected from the outer rotary member by a clutch tooth, and the pinion shafts are radially arranged on the inner rotary member.

16. The differential apparatus according to claim 12, wherein a clutch tooth is provided on at least one of the side gears and capable of being connected with and disconnected from the rotary member.

17. A differential apparatus, comprising:

a long pinion shaft radially arranged in a rotary member;

a first short pinion shaft radially arranged in the rotary member;

a second short pinion shaft radially arranged in the rotary member and having an identical configuration with the first short pinion shaft;

pinions rotatably supported on the respective pinion shafts;

a pair of side gears meshing with the pinions, and disposed coaxially with the rotary member; and a junction, at which one side of the first short pinion shaft in an axial direction of the first short pinion shaft is connected to the long pinion shaft, and one side of the second short pinion shaft is connected to the long pinion shaft;

a first fixing member that unrotatably fixes the first short pinion shaft to the rotary member at the other side of the first short pinion shaft; and a second fixing member that unrotatably fixes the second short pinion shaft to the rotary member at the other side of the second short pinion shaft.

18. The differential apparatus according to claim 17, wherein the first fixing member is a first pin, and the second fixing member is a second pin.

* * * * *